US008326002B2

(12) United States Patent
Hill

(10) Patent No.: US 8,326,002 B2
(45) Date of Patent: Dec. 4, 2012

(54) METHODS OF FACIAL CODING SCORING FOR OPTIMALLY IDENTIFYING CONSUMERS' RESPONSES TO ARRIVE AT EFFECTIVE, INCISIVE, ACTIONABLE CONCLUSIONS

(75) Inventor: Daniel A. Hill, St. Paul, MN (US)

(73) Assignee: Sensory Logic, Inc., Minneapolis, MN (US)

( * ) Notice: Subject to any disclaimer, the term of this patent is extended or adjusted under 35 U.S.C. 154(b) by 309 days.

(21) Appl. No.: 12/856,113

(22) Filed: Aug. 13, 2010

(65) Prior Publication Data

US 2011/0038547 A1    Feb. 17, 2011

Related U.S. Application Data

(60) Provisional application No. 61/233,625, filed on Aug. 13, 2009.

(51) Int. Cl.
| G06K 9/00 | (2006.01) |
| G06K 9/46 | (2006.01) |
| G06K 9/66 | (2006.01) |

(52) U.S. Cl. ................................ 382/118; 382/190
(58) Field of Classification Search .................. 382/118, 382/190
See application file for complete search history.

(56) References Cited

U.S. PATENT DOCUMENTS

| 3,034,500 A | 5/1962 | Backster, Jr. |
| 3,548,806 A | 12/1970 | Fisher |
| 3,870,034 A | 3/1975 | James |
| 4,448,203 A | 5/1984 | Williamson et al. |
| 4,627,818 A | 12/1986 | Von Fellenberg |
| 4,794,533 A | 12/1988 | Cohen |

(Continued)

FOREIGN PATENT DOCUMENTS

JP    08115367 A    5/1996

(Continued)

OTHER PUBLICATIONS

Bartlett, M.S., et al., "Measuring facial expressions by computer image analysis", Psychophysicology, 36 (1999), p. 253-263. Cambridge University Press.

(Continued)

Primary Examiner — Aaron W Carter
(74) Attorney, Agent, or Firm — Schwegman Lundberg & Woessner, P.A.

(57) ABSTRACT

The present disclosure relates to a method of assessing consumer reaction to a stimulus, comprising receiving a visual recording stored on a computer-readable medium of facial expressions of at least one human subject as the subject is exposed to a business stimulus so as to generate a chronological sequence of recorded facial images; accessing the computer-readable medium for automatically detecting and recording expressional repositioning of each of a plurality of selected facial features by conducting a computerized comparison of the facial position of each selected facial feature through sequential facial images; automatically coding contemporaneously detected and recorded expressional repositionings to at least a first action unit, wherein the action unit maps to a first set of one or more possible emotions expressed by the human subject; assigning a numerical weight to each of the one or more possible emotions of the first set based upon both the number of emotions in the set and the common emotions in at least a second set of one or more possible emotions related to at least one other second action unit observed within a predetermined time period.

23 Claims, 12 Drawing Sheets

U.S. PATENT DOCUMENTS

| | | | |
|---|---|---|---|
| 4,807,642 | A | 2/1989 | Brown |
| 4,817,628 | A | 4/1989 | Zealer et al. |
| 4,859,050 | A | 8/1989 | Borah et al. |
| 4,964,411 | A | 10/1990 | Johnson et al. |
| 4,975,960 | A | 12/1990 | Petajan |
| 5,031,228 | A | 7/1991 | Lu |
| 5,084,819 | A | 1/1992 | Dewey et al. |
| 5,092,343 | A | 3/1992 | Spitzer et al. |
| 5,124,911 | A | 6/1992 | Sack |
| 5,148,477 | A | 9/1992 | Neely et al. |
| 5,164,992 | A | 11/1992 | Turk et al. |
| 5,219,322 | A | 6/1993 | Weathers |
| 5,247,938 | A | 9/1993 | Silverstein et al. |
| 5,436,830 | A | 7/1995 | Zaltman |
| 5,607,186 | A | 3/1997 | Schroeder et al. |
| 5,663,900 | A | 9/1997 | Bhandari et al. |
| 5,676,138 | A | 10/1997 | Zawilinski |
| 5,710,833 | A | 1/1998 | Moghaddam et al. |
| 5,725,472 | A | 3/1998 | Weathers |
| 5,741,217 | A | 4/1998 | Gero |
| 5,772,591 | A | 6/1998 | Cram |
| 5,774,357 | A | 6/1998 | Hoffberg et al. |
| 5,774,591 | A | 6/1998 | Black et al. |
| 5,802,208 | A | 9/1998 | Podilchuk et al. |
| 5,802,220 | A | 9/1998 | Black et al. |
| 5,871,211 | A | 2/1999 | Was |
| 5,875,108 | A | 2/1999 | Hoffberg et al. |
| 5,901,244 | A | 5/1999 | Souma et al. |
| 6,004,312 | A | 12/1999 | Finneran et al. |
| 6,008,817 | A | 12/1999 | Gilmore, Jr. |
| 6,009,210 | A | 12/1999 | Kang |
| 6,026,321 | A | 2/2000 | Miyata et al. |
| 6,026,322 | A | 2/2000 | Korenman et al. |
| 6,088,040 | A | 7/2000 | Oda et al. |
| 6,099,319 | A | 8/2000 | Zaltman et al. |
| 6,185,534 | B1 | 2/2001 | Breese et al. |
| 6,292,575 | B1 | 9/2001 | Bortolussi et al. |
| 6,309,342 | B1 | 10/2001 | Blazey et al. |
| 6,311,190 | B1 | 10/2001 | Bayer et al. |
| 6,345,109 | B1 | 2/2002 | Souma et al. |
| 6,422,999 | B1 | 7/2002 | Hill |
| 6,443,840 | B2 | 9/2002 | Von Kohorn |
| 6,453,194 | B1 | 9/2002 | Hill |
| 6,533,583 | B1 | 3/2003 | Sportelli |
| 6,611,613 | B1 | 8/2003 | Kang et al. |
| 6,681,032 | B2 | 1/2004 | Bortolussi et al. |
| 6,879,709 | B2 | 4/2005 | Tian et al. |
| 7,003,139 | B2 | 2/2006 | Endrikhovski et al. |
| 7,113,916 | B1 | 9/2006 | Hill |
| 7,120,880 | B1 | 10/2006 | Dryer et al. |
| 7,233,684 | B2 | 6/2007 | Fedorovskaya et al. |
| 7,246,081 | B2 | 7/2007 | Hill |
| 7,319,780 | B2 * | 1/2008 | Fedorovskaya et al. ...... 382/128 |
| 7,930,199 | B1 * | 4/2011 | Hill ............... 705/7.29 |
| 2002/0108125 | A1 | 8/2002 | Joao |
| 2003/0133599 | A1 | 7/2003 | Tian et al. |
| 2003/0156304 | A1 | 8/2003 | Fedorovskaya et al. |
| 2003/0165269 | A1 | 9/2003 | Fedorovskaya et al. |
| 2003/0165270 | A1 | 9/2003 | Endrikhovski et al. |
| 2004/0101212 | A1 | 5/2004 | Fedorovskaya et al. |
| 2005/0079474 | A1 | 4/2005 | Lowe |
| 2007/0066916 | A1 | 3/2007 | Lemos |
| 2007/0201731 | A1 * | 8/2007 | Fedorovskaya et al. ...... 382/118 |
| 2008/0096533 | A1 * | 4/2008 | Manfredi et al. ........... 455/412.1 |
| 2009/0285456 | A1 * | 11/2009 | Moon et al. .................... 382/118 |
| 2010/0266213 | A1 * | 10/2010 | Hill ............... 382/218 |
| 2012/0002848 | A1 * | 1/2012 | Hill ............... 382/118 |

FOREIGN PATENT DOCUMENTS

| | | |
|---|---|---|
| WO | WO 02/087443 A1 | 11/2002 |
| WO | WO 2004/091371 A2 | 11/2004 |

OTHER PUBLICATIONS

Bassili, JN., "Emotion recognition: the role of facial movement and the relative importance of upper and lower areas of the face", Journal of Personality and Social Psychology 1979, vol. 37, No. 11, p. 2049, 2055.

Buam, K., et al., "Perception of Emotions: Measuring decoding accuracy of adult prosodic cues varying intensity", Summer 1998, Journal of Nonverbal Behavior, p. 89-108.

Chen, Qimei, et al., "Attitude toward the Site", Sep. 1999, Journal of Advertising Research, p. 27.

Cohn, J., et al., "A Comparative Study of Alternative FACS Coding Algorithms", tech. report CMU-RI-TR-02-06, Robotics Institute, Carnegie Mellon University, Nov. 2001.

Derbaix, C., "The Impact of Affective Reactions on Attitudes toward the Advertisement and the Brand: A Step toward Ecological Validity", Journal of Marketing Research, vol. 32, No. 4 (Nov. 1995), pp. 470-479.

Ekman, P. & Friesen, W.V., "Manual for the Facial Action Coding System", 1978, 352 pages; Human Interaction Laboratory Department of Psychiatry, University of California.

Ekman, P. & Friesen, W.V., "Unmasking The Face, A Guide to Recognizing Emotions from Facial Clues", 1979.

Ekman, P., "Facial Clues to Deceit", Telling Lies, Clues to Deceit in the Marketplace, Politics, and Marriage, p. 123-161, 1992.

Ekman, P., et al., "Measuring Facial Movement", Environmental Psychology and Nonverbal Behavior, vol. 1, No. 1, p. 56-75, 1976.

Ekman, P., et al., "Facial Signs of Emotional Experience," Journal of Personality and Social Psychology, vol. 39, No. 6, p. 1125-1134, 1980.

Ekman, P., et al., "Final Report to NSF of the Planning Workshop on Facial Expression", Aug. 1, 1992. pp. 1-87, Retrieved from http://mambo.usc.edu/psl/nsf.txt on Jul. 9, 2001.

Essa, I., et al., "Facial Expression Recognition using a Dynamic Model and Motion Energy" M.I.T. Media Laboratory Perceptual Computing Section Technical Report No. 307, Jun. 20-23, 1995, p. 1-8.

Frabotta, David, "Changing Focus", Feb. 21, 2000, Hotel & Motel Management, p. 1, 68.

Gordon-Murnane, Laura "Evaluating Net Evaluators", Feb. 1999, Searcher 7, 2, 57(1).

Hazlett, R., et al. "Emotional Response to Television Commercials: Facial EMG vs. Self-Report", Mar. 1999, Journal of Advertising Research, p. 7-23.

http://dataface.nirc.com/Expression/FACS/body_facs.html, Facial Affect Coding System, Jul. 9, 2001.

Izard, C., et al., "A System for Identifying Affect Expressions by Holistic Judgments (AFFEX)", Instructional Resources Center, University of Delaware, Newark, Delaware (1983).

Izard, C.E., "The Maximally Discriminative Facial Movement Cody System, (Rev. ed.)", Instructional Resources Center, University of Delaware, Newark, Delaware (1983).

Gallup & Robinson, Impact, "CERA—A new System for Measuring Emotion in Advertising", 9:1, Winter 2000, p. 1-2.

Lee, C., et al., "Measuring Influence of the family decision making process using an observational method", 1998 Qualitative Market Research, p. 88-98.

Lien. J., et al., "A Multi-Method Approach for Discriminating Between Similar Facial Expressions, Including Expression Intensity Estimation", Proceedings of the IEEE Conference on Computer Vision and Pattern Recognition (CVPR '98), Jun. 1998.

Lien. J., et al., "Detection, Tracking, and Classification of Action Units in Facial Expression", Journal of Robotics and Autonomous Systems, Jul. 1999, p. 1-39.

Marcolin, et al., "Assessing User Competence: Conceptualization and Measurement", Information Systems Research. Linthicum: Mar. 2000, vol. 11, Issue 1, p. 37-60.

Sejnowski, T., Computational Neurobiology, http://www.salk.edu/faculty/sejnowski.html, Jul. 9, 2001, Table 11-1 Emotional Predictions, p. 138-139, undated.

Tian, et al., "Recognizing action units for facial expression analysis", IEEE Transactions on Pattern Analysis and Machine Intelligence, vol. 23, No. 2, Feb. 2001, p. 97-115.

Hill, Daniel A.; "Facial Coding Analysis—Chapter 10"; Sensory Logic, Inc., 2002, pp. 151-179.

* cited by examiner

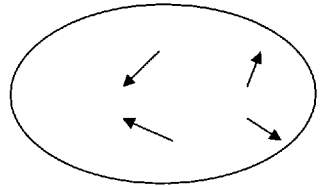
FEAR
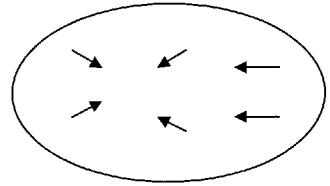
DISGUST
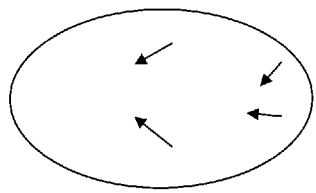
SADNESS
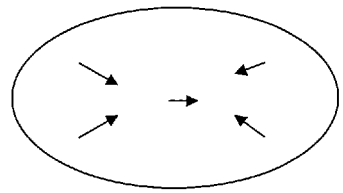
ANGER
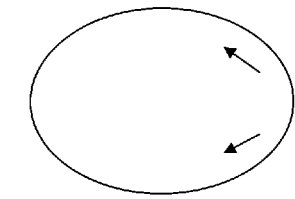
HAPPINESS
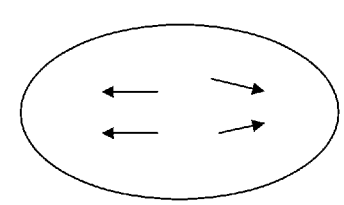
SURPRISE
Fig. 1

U = upper face (eyes, brow)
L = lower face (mouth)
A = all of face (head movement)
a – Happy,      6 (U) + 12 (L) = duchenne smile; 12 (L) only = social smile
b – Anger       4, 5, 7 (U); 10, 17, 22, 23, 24, 25, 26 (L)
c – Disgust     9 (U); 10, 15, 16, 17, 25, 26 (L)
d – Fear        1, 2, 4, 5 (U); 20, 25, 26, 27 (L)
e – Sadness     1, 4, 6, 64 (U); 11, 15, 17, 25, 26 (L); 54 (A)
f – Contempt    10, 14 (L)
g – Surprise    1, 2, 5 (U); 26, 27 (L)

| AU | Emotion | AU | Emotion |
|---|---|---|---|
| U 1 | d, e, g | L 16 | c |
| U 2 | d, g | L 17 | b, c, e |
| U 4 | b, d, e | L 20 | d |
| U 5 | b, d, g | L 22 | b |
| U 6 | a, e | L 23 | b |
| U 7 | b | L 24 | b |
| U 9 | c | L 25 | b, c, d, e |
| L 10 | b, c, f | L 26 | b, c, d, e, g |
| L 11 | e | L 27 | d, g |
| L 12 | a | A 54 | e |
| L 14 | f | U 64 | e |
| L 15 | c, e | | |

Fig. 2

| Emotion | AUs Expressed |
|---|---|
| Surprise | 1 + 2 + 26 OR 1 + 2 + 27, 1 + 2 + 5 (with or without 26 or 27), 5 + 26, 5 + 27 |
| Fear | 1+2+4+5 (with or without 25, 26 or 27)<br>1+2+4+5+20+25 or 26 or 27<br>1+2+5+20+25 or 26 or 27<br>5+20 (with or without 25, 26 or 27) |
| Sadness | 1+4+11 (25 or 26 optional, and with or without 54 and/or 64)<br>1+4+11+15 (25 or 26 optional, and with or without 54 and/or 64)<br>1+4+15 (25 or 26 optional, and with or without 54 and/or 64)<br>1+4+15+17 (25 or 26 optional, and with or without 54 and/or 64)<br>6+15 (25 or 26 optional, and with or without 54 and/or 64)<br>11+15 (25 or 26 optional, and with or without 54 and/or 64)<br>11+17 (25 or 26 optional, and with or without 54 and/or 64) |
| Anger | 4+5+7+10+22+23+25 or 26 (optional: delete 4, 5, 7 or 10)<br>4+5+7+10+23+25 or 26<br>4+5+7+17+23 |

Fig. 3

| SURPRISE | ANGER | DISGUST | SADNESS | FEAR |
|---|---|---|---|---|
| *DELIGHT* *RELIEF* | *PRIDE* VENGEANCE | `MORBIDITY` | NOSTALGIA *YEARNING* | GUILT *HOPE* |
| SURPRISE | OUTRAGE | | EMBARRASSMENT `DISAPPOINTMENT` | *AWE* `ALARM` |
| | ANGER | CONTEMPT RESENTMENT | SULLENNESS `ENVY` | JEALOUSY |
| | | DISGUST | REGRET | SHAME PRUDISHNESS |
| | | | SADNESS | DESPAIR `DISTRESS` |

HAPPINESS

*ITALIC* = POSITIVE EMOTIONS
BOLD = NEGATIVE EMOTIONS
`COURIER` = NEUTRAL EMOTIONS

PRIMARY EMOTIONS
AND SECONDARY COMBINATIONS

FIG. 6

| Positive/Neutral | | Neutral/Negative | | Negative | | Strong Negative | |
|---|---|---|---|---|---|---|---|
| 12 | Happy | 1 | Fear, Sadness, Surprise | 4 | Anger, Fear, Sadness | 7 | Anger |
| 6 | Happy, Sadness | 2 | Fear, Surprise | 5 | Anger, Fear, Surprise | 9 | Disgust |
| | + | 11 | Sadness | 15 | Disgust, Sadness | 10 | Anger, Disgust, Contempt |
| | | 25 | All but Happy, Contempt, Surprise | 17 | Anger, Disgust, Sadness | 14 | Contempt |
| | | 26 | All but Happy, Contempt | 20 | Fear | 16 | Disgust |
| | | 54 | Sadness | 24 | Anger | 22 | Anger |
| | | 64 | Sadness | 27 | Fear, Surprise | 23 | Anger |

Fig. 10

METHODS OF FACIAL CODING SCORING FOR OPTIMALLY IDENTIFYING CONSUMERS' RESPONSES TO ARRIVE AT EFFECTIVE, INCISIVE, ACTIONABLE CONCLUSIONS

CROSS REFERENCE TO RELATED APPLICATION

This application claims priority to U.S. Provisional Application No. 61/233,625, filed on Aug. 13, 2009, the contents of which is hereby incorporated by reference in its entirety.

FIELD OF THE INVENTION

The present disclosure relates to methods of measuring and analyzing consumer reaction to marketing stimuli. The present disclosure further relates to using facial muscles to measure and analyze consumer reaction to marketing stimuli. More particularly, the present disclosure relates to use of temporal and weighted analysis techniques to improve the process by which emotional reactions are determined from facial muscle data collected during exposure of consumers to the marketing stimuli.

BACKGROUND OF THE INVENTION

Traditional market research to date has mostly relied on verbal input and ratings. However, advances in neurobiology have confirmed that people are largely emotional, subconscious (intuitive) decision-makers. Armed with this new knowledge it is imperative for market research to monitor, gauge, capture and gain insights from emotions, as opposed to the traditional emphasis on capturing rationally-oriented, cognitively-filtered input from test participants. How exactly to capture the emotional input, and then what to make of it, poses a huge dilemma for market researchers and major corporate clients struggling to understand how to "read" the emotional data in order to make better decisions related to massive advertising expenditures, new product launches, store environments, packaging, brand positioning, and a host of other market research type issues.

Of all the various psychological or neurobiological means of capturing emotional data, facial coding is the single most attractive option. Facial coding attempts to read the facial expressions of individuals to gain insight into their emotional responses. One reason for the appeal of facial coding, is the longstanding tradition of documentation in this area. Charles Darwin originated the practice, studying not only his own children's facial expressions but those of others. Darwin found that even a person born blind has the same facial expressions as a non-blind individual. In other words, facial expressions are universal and innate (from birth) ways of expressing emotions. Additionally, facial expressions also represent the only place in the body where the muscles attach right to the skin. Another key advantage of facial coding over other psycho-physiological methods is that it is tangible, on the surface, with results evident to the naked eye. This is in contrast to fMRI brain scans or EEG methods, both of which are more invasive, costly, and difficult to execute. These later methods involve a "black box" approach of reading physiological data based on either blood flow or electrical impulses within the brain.

The modern facial coding pioneer is Paul Ekman, an academic who with his partner, Wally Friesen, created the Facial Action Coding System ("FACS"). FACS uses identification of the contraction and/or relaxation of various facial muscles to attempt to determine an individuals emotions. FACS defines 32 Action Units ("AU"s) which represent a contraction or relaxation of one or more facial muscles. These AUs can then be processed to assign an emotion based on the AUs observed. The assignment of AUs to emotions is based upon well documented research into the link between emotion and facial muscle movements. FACS is fully described in Ekman, P., Friesen, W. V., Facial Action Coding System: A Technique for the Measurement of Facial Movement (also known by its acronym of FACS), Consulting Psychologists Press, Palo Alto, Calif. (1978), which is hereby incorporated by reference in its entirety herein.

Several methods exist for reading the facial muscles of an individual when exposed to a stimulus to assign AUs. A first method is to apply sensors to the skin of the face to capture precise readings of muscle movements. A second method is utilizing trained observers who observe the subject's reaction to the stimulus in real time or later by watching a video record of the subject. A third method is to employ automated methods that utilize computer technology to automatically generate AU codings for facial muscle activity.

Such automated methods detect frontal faces in the video stream and code each frame with respect to a variety of facial muscle movements. Such methods could include algorithms based on AdaBoost, support vector machines, and linear discriminant analysis, as well as feature selection techniques. One example technique would be to select a subset of Gabor filters using AdaBoost and then train support vector machines on the outputs of the filters selected by AdaBoost. Another example method may be to utilize "virtual" dots which are placed over a participant's face on a computer screen. Subsequent movements of facial muscles are then tracked by a computer as movements of these dots.

Facial muscle capture and coding techniques are described in detail in U.S. Pat. No. 7,113,916 issued Sep. 26, 2006 and U.S. Pat. No. 7,246,081 issued Jul. 17, 2007, both entitled "Method of Facial Coding Monitoring for the Purpose of Gauging the Impact and Appeal of Commercially-Related Stimuli," both issued to Applicant, and both of which are hereby incorporated by reference in their entireties. Capture and coding techniques and analysis is also described in pending U.S. patent application Ser. No. 11/062,424 titled "Computerized Method of Assessing Consumer Reaction to a Business Stimulus Employing Facial Coding," filed Feb. 20, 2005 by Applicant and U.S. patent application Ser. No. 11/491,535 titled "Method and Report Assessing Consumer Reaction to a Stimulus by Matching Eye Position with Facial Coding," filed Jul. 21, 2006 by Applicant, both of which are hereby incorporated by reference in their entireties.

While FACS is generally accepted as the "gold standard" within the field, other less sophisticated or detailed methods exist for coding facial coding activity to gather emotional data. One of these less sophisticated methods, which will be hereinafter referred to as the "Simplified" method, consists of taking a simplified topline assessment approach to how a particular emotion reveals itself on the face based on as little as one to three places to look for generalized muscle movement, i.e., near the eyes/eyebrow region, near the mouth, or chin, or in one case the nose, and deriving from cruder generalized findings of basic movement in those areas how a person is feeling. While not limited to such an example, an example of this method is diagrammed in FIG. 1.

Various embodiments of the present disclosure are independent of the method of coding utilized, whether FACS or Simplified, and is also independent of whether the coding is done automatically or manually as previously described.

The accuracy of using facial muscles to discover an individual's emotions depends on how the raw data is translated into emotions, and how those emotions are used to draw conclusions. Specifically, in the FACS system, the accuracy of the system depends largely on how the AUs are mapped to emotions and how those emotions are then analyzed to produce meaningful results. The analysis portion can be tricky because facial coding data can be captured on a split-second basis, down to 1/30th of a second, and in the case of using FACS the analysis involves numerous facial muscles and approximately 20 or more action units (or AUs). As a result, the goal of extracting the most optimal, insightful and decisive data from facial coding can present difficult challenges. Even with the Simplified method of detecting and recording facial muscle activity, identifying the data that is more meaningful than other data to help in understanding in a meaningful way consumers' reactions to various forms of advertising/marketing, product/service innovations, new packaging, brand positioning, and responses to the acting talent that is or may appear in advertising, etc., represents both a substantial problem and a tremendous opportunity for companies that want to learn best from the data. Thus, there exists a need in the art for an accurate scoring means for deriving emotions from the captured raw data of facial coding.

BRIEF SUMMARY OF THE INVENTION

The present disclosure, in one embodiment, relates to a method of assessing consumer reaction to a stimulus, comprising receiving a visual recording stored on a computer-readable medium of facial expressions of at least one human subject as the subject is exposed to a business stimulus so as to generate a chronological sequence of recorded facial images; accessing the computer-readable medium for automatically detecting and recording expressional repositioning of each of a plurality of selected facial features by conducting a computerized comparison of the facial position of each selected facial feature through sequential facial images; automatically coding contemporaneously detected and recorded expressional repositionings to at least a first action unit, wherein the action unit maps to a first set of one or more possible emotions expressed by the human subject; assigning a numerical weight to each of the one or more possible emotions of the first set based upon both the number of emotions in the set and the common emotions in at least a second set of one or more possible emotions related to at least one other second action unit observed within a predetermined time period.

While multiple embodiments are disclosed, still other embodiments of the present disclosure will become apparent to those skilled in the art from the following detailed description, which shows and describes illustrative embodiments of the disclosure. As will be realized, the various embodiments of the present disclosure are capable of modifications in various obvious aspects, all without departing from the spirit and scope of the present disclosure. Accordingly, the drawings and detailed description are to be regarded as illustrative in nature and not restrictive.

BRIEF DESCRIPTION OF THE DRAWINGS

While the specification concludes with claims particularly pointing out and distinctly claiming the subject matter that is regarded as forming the various embodiments of the present disclosure, it is believed that the embodiments will be better understood from the following description taken in conjunction with the accompanying Figures, in which:

FIG. 1 is a simplified method of reading faces for emotions according to one embodiment of the present disclosure.

FIG. 2 is a table according to one embodiment of the present disclosure that shows the relationship of AUs to specific emotions.

FIG. 3 is a table according to one embodiment of the present disclosure that shows the action units in combination as reflective of a given emotion.

FIG. 6 is a table showing how core emotions can be mapped to additional, compound or combination emotions, according to one embodiment of the present disclosure.

FIG. 10 shows emotions classified by their valence, according to one embodiment of the present disclosure.

DETAILED DESCRIPTION

Figure 4:
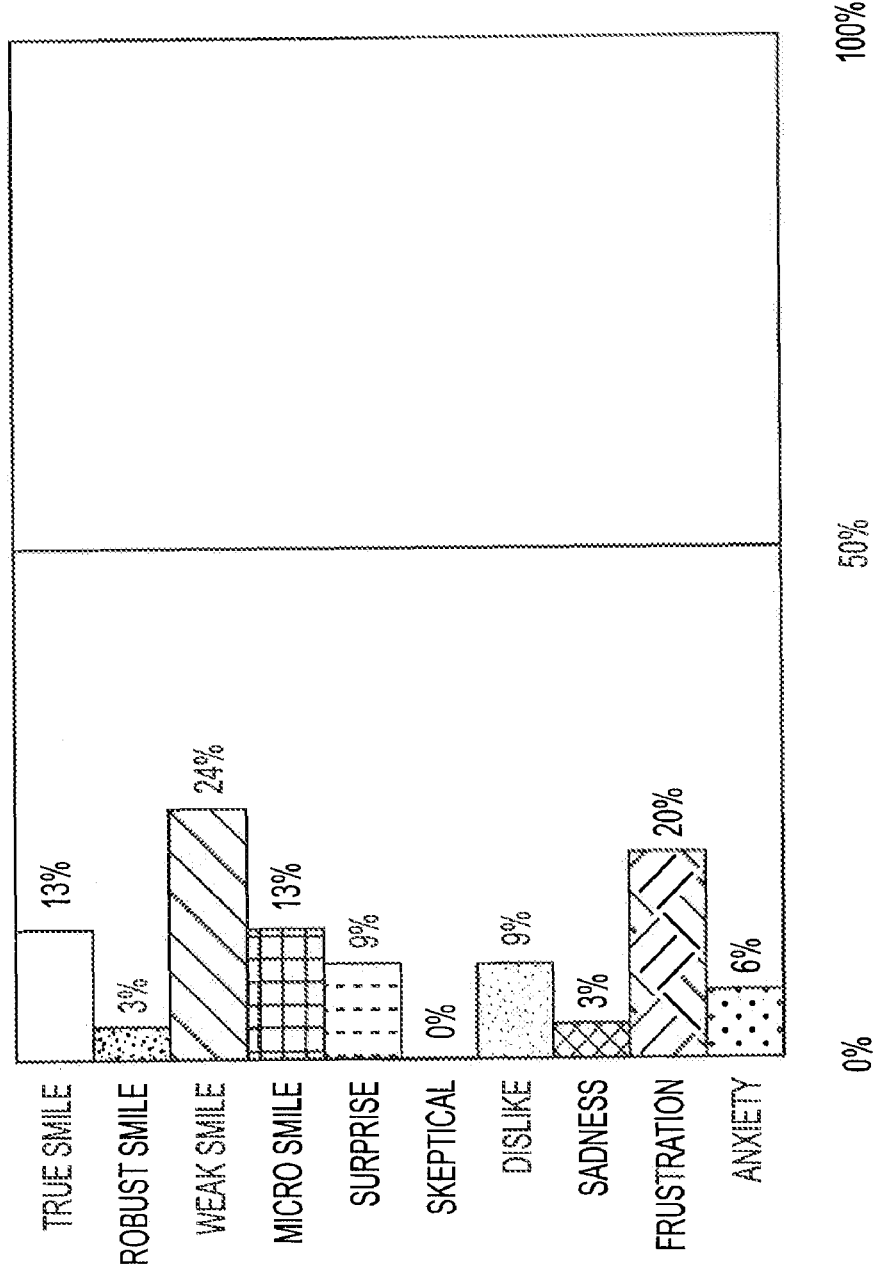
FIG. 4 is a display of ten emotional states according to one embodiment of the present disclosure.

The present disclosure relates to novel and advantageous methods of measuring and analyzing consumer reaction to marketing stimuli. Particularly, the present disclosure further relates to novel and advantageous methods of using facial muscles to measure and analyze consumer reaction to marketing stimuli. More particularly, the present disclosure relates to novel and advantages use of temporal and weighted analysis techniques to improve the process by which emotional reactions are determined from facial muscle data collected during exposure of consumers to the marketing stimuli.

The present disclosure presents several different methods in which the raw facial coding data may be scored to extract the most meaningful results. Elements from each method may or may not be combined in whole or in part with other elements in that method or across other disclosed methods in order to provide more meaningful results.

In one embodiment of the present disclosure, the first step in the method is to obtain raw facial activity data. In FACS, the raw data includes the individual action units observed. To obtain the raw data, an individual or group of individuals may be exposed to an advertisement stimulus, and their reactions may be recorded. Based on the facial muscle movements of the participants, the various AUs can be identified that relate to the particular emotions that the participants expressed in reaction to the stimulus. This process of exposing the participants to the stimulus, recording the various AUs expressed, and generating conclusions regarding the AUs expressed can be done by automatically be a combination of hardware devices and computer software. In one embodiment of the present disclosure, the stimulus can be a TV spot, web site usability test, response to watching video of a staged marketing event, print ad, radio spot exposure, product trial usage, experiencing a store environment in reality or through a simulated exposure to it, and other events or presentations that are designed to elicit an emotional reaction from an individual or group of individuals.

The hardware devices used to implement the current disclosure can include a computer and a video or still image capture device. The computer can be a single computer, or a plurality of computers. The computer can contain a microprocessor, volatile memory, non-volatile memory, and input means such as a keyboard and/or mouse or other pointing device, an output means such as a computer monitor or screen, printer, and/or audio speaker. The computer runs software which contains instructions executable by the microprocessor. The software may include computer executable instructions that enable the computer to do one or more of: display an advertisement, either statically, or as a video with sound, record the facial responses of a user, calculate AUs either in real time or later based upon the recorded video, calculate the given emotion displayed based on detecting the AUs, and display the results through an output device. The recorded video, and/or AUs can then be stored in the non-volatile storage, or sent to a remote computer system thru the network card. If the software does not detect the AUs in real time, it can do so after the exposure to the stimulus is completed. The displayed emotions or conclusions may be displayed on the screen in table or graph form, printed, electronically stored for later display, or sent to a remote location.

The functionality of the software can be entirely inside the computer, or the functionality of the software can be spread out amongst multiple computers, each performing a different function or part of the processing. For example, in one embodiment, there might be two computers—one that administers the stimulus and records the video, and a second computer that receives the video and codes the AUs and generates the results.

The video still image or capture device can be either a part of the computer or a standalone device. The video can be connected to the computer through any known peripheral device connection such as USB, PCI, LPT, serial, or parallel connections. The video recorder can be completely standalone, in which case a user may upload the video manually into the computer system. The video capture device can be operated automatically through the software or manually by an operator.

According to one embodiment of the present disclosure, once the AUs are identified, the scoring analysis can begin. If FACS is being utilized as the scoring method, for example, and as FIG. 2 makes abundantly evident, the various AUs often can have multiple emotional meanings. This makes it hard to determine which emotion was necessarily being felt by a test participant. For instance, AU #1 could represent fear, surprise, and/or sadness, and by itself all that can be confidently said is that one of these three emotions is being expressed.

More specifically, FIG. 3 makes clear that the original FACS system was based on detecting a series of AUs together, almost like a chromosome chain, to qualify as the full expression of a given emotion. For example, surprise consists of AUs #1, #2, and #26 expressed simultaneously. In actual practice, however, achieving a combination of two or more AUs in reaction to stimulus, or question about it, at a given moment in time may be rare because the marketing material may not be that engaging or meaningful to a test participant. As a result, single occurrences or even multiple AUs may be spotted or captured through facial coding, but not necessarily in keeping with a full expression of an emotion involving a specific string of, say, the three to five AUs shown in combination in FIG. 3.

Therefore, one proposed embodiment of the present disclosure is to arrive at a solution that takes into account the AU chains listed in FIG. 3, but making allowances for the reality that these various full AU chain possibilities may not materialize sufficiently to create the opportunity for meaningful scoring, and results.

One solution to the problem might be to code each video frame or group of frames and for each AU expressed during that frame assign a value to each emotion which an AU could represent. In one embodiment, for example, this value may be based on the number of emotions that an AU can potentially represent. Thus, for AU #2, fear and surprise (the only two emotions related to AU #2) could each receive ½ of a point. For AU #5, anger, fear, and surprise (the only 3 emotions related to AU #5) could each receive ⅓ of a point. Each AU expressed in a given time interval may be similarly coded. The numerical results could then be stored for that particular frame, and then the process could repeat for the next time interval.

In order to more accurately ascertain a person's emotions from the AUs they are expressing, various embodiments of the present disclosure may look beyond simply the current AU, and use other AUs expressed in close temporal proximity to the AU being analyzed to assign a higher or lower probability value to certain emotions than their pro-rata share to indicate an increased or decreased likelihood that a particular emotion is being expressed by having observed other behavior indicating that particular emotion is, or is not being expressed.

For example, if AU #1, which corresponds to fear, sadness, and surprise is shown followed closely by the AU #20, which applies only to the emotion of fear, then fear is the predominant reaction taking place and so AU #1 and AU #20, having been found to be expressed in a relative tight timing sequence, could be linked together to identify the subject's predominant emotional response as one of fear at that point in the stimulus. As a result, the occurrence of AU #1, followed in acceptable close temporal proximity by AU #20, might allow for a weighted scoring that could assign higher weight to fear. For example, one implementation would assign AU #1 to be ½ fear, ¼ sadness, and ¼ surprise (to get to the total of a "1" value for AU #1). AU #20 could receive a full "1" in the scoring column for fear in and of itself.

FIG. 4 shows how the emotional responses of a group of test participants to a given stimulus can be divided across 10 emotional categories, which relate back to which emotions each given AU relates. Such data is derived from a series of individuals, meaning that if one were to go back to individual #1, when AU#1 occurs, followed by AU #20 very soon thereafter, redistributing the meaning of AU #1 as ½ fear, ¼ sadness, and ¼ surprise—rather than the usual even split across the three emotions—means that on an accumulative basis, something like FIG. 4 could look different and be more precise than simply accepting that AU #1 can't be more precisely designated than a general, even three-way split. The precise distribution of weights thereby can be adjusted based on which emotions are common across AUs observed within a close proximity.

In more general terms, one skilled in the art would appreciate that there are numerous ways in which, weightings and links can be created to take individual scores and fine-tune the specific emotion or emotions to which they relate based on the temporal relationships of the expressed AUs. In particular, seven AUs in FACS can, by themselves, be assigned to more than one emotion. But in a system whereby proximity serves as an aid, or the overall pattern of emoting per individual is taken into account, the AUs that apply to more than one emotion can be identified more narrowly at times, increasing accuracy. Weighting techniques can also take advantage of data suggesting frequency of emotions in general, or frequency of emotions in response to particular situations.

In one embodiment of the present disclosure, the weighting given to each emotion can be adjusted based on how far apart temporally each AU is observed, so that for example, if AU #1 and AU #20 are observed very close together, fear could get more than ½ weight, whereas if AU #1 and AU #20 are observed relatively farther apart in time, fear could get a ⅜ weight (instead of the stronger ½ weight).

It is recognized that other weighted values may be used and the values discussed herein are not meant to be limiting and are used for ease of illustration only. Moreover, while the above example considered just two AUs expressed in relative proximity, the method is by no means limited to analysis of just two AUs in temporal proximity, but can be applied to as many AU "temporal chains" as desired. Thus for example, recognition of AU #1, #2, #4, and #5 in close proximity indicates that "fear" is likely present as all of those AUs are involved in expressing fear. Thus, in one embodiment, the weighting of results can take into account how complete the "chromosome" chain in FACS is for a given emotion.

Even if the Simplified method is used for coding purposes, the issue of temporal proximity may not be as complicated, and benefit as much from algorithms being written to account for the possibilities and weightings of AUs. But it can still be desirable and valuable to increase the accuracy of reading movements because if, as shown in FIG. 1, fear and sadness happen simultaneously, followed by another instance of fear shortly thereafter, identifying on the individual basis, followed by the composite basis of all test participants, which emotions were most prevalent or dominant at, say, second 10 of being exposed to a TV spot, can materially aid the analysis since fear and sadness have very different meanings as negative emotions.

One advantageous usage of the above disclosed method may involve dividing surprise reactions into positive or negative in emotional valence based on proximity and weight/predominance of the other AUs that get shown in a time period following the surprise facial muscle activity. Surprise is often regarded by psychologists as a "pre" or "neutral" emotion because it can mean either a "wow," for example, when linked to happiness or an "egads," for example, when linked to fear, for instance. It's what emotion occurs in conjunction with surprise or afterwards that may determine or tip the balance regarding its valence, i.e., is it a positive or negative feeling. By using the embodiments of the methods disclosed herein, surprise reactions can often be accorded a positive or neutral valence. For example, returning to FIG. 4 for a moment, it shows surprise as the weakest of five types of positive reactions: four decreasing levels of smiles, followed by surprise. However, for greater accuracy it may be desirable to assign surprise as either positive surprise or negative surprise, when possible, depending on which other emotions are occurring in proximity with it.

To be more precise, let's consider a case where AU #2 is shown, by itself, meaning, for example, that a ½ two-way split between surprise and fear might be assigned. However, despite the fact that fear, a negative emotion, is one possible interpretation of AU 2, along with surprise, that doesn't necessarily mean that this AU #2 can be placed in the negative surprise category with certainty. What could aid in making that determination with more assurance is if AU #23, anger, and/or AU #20, fear, for instance, were to happen in close proximity with AU #2, helping to tip the balance to assigning AU #2 as expressing fear and negative surprise. Under the Simplified method of facial coding, for another example, surprise by itself could, meanwhile, be assigned to the positive or negative surprise category based on whether a smile or disgust were to happen simultaneously or in close conjunction with the surprise emoting. In another embodiment of the present disclosure, surprise can be affected by smiles occurring within a specific time frame before the AU for surprise. In these instances, the negative emotions that may have been previously paired with surprise can be removed and replaced by the smile that occurred prior.

Figure 5:
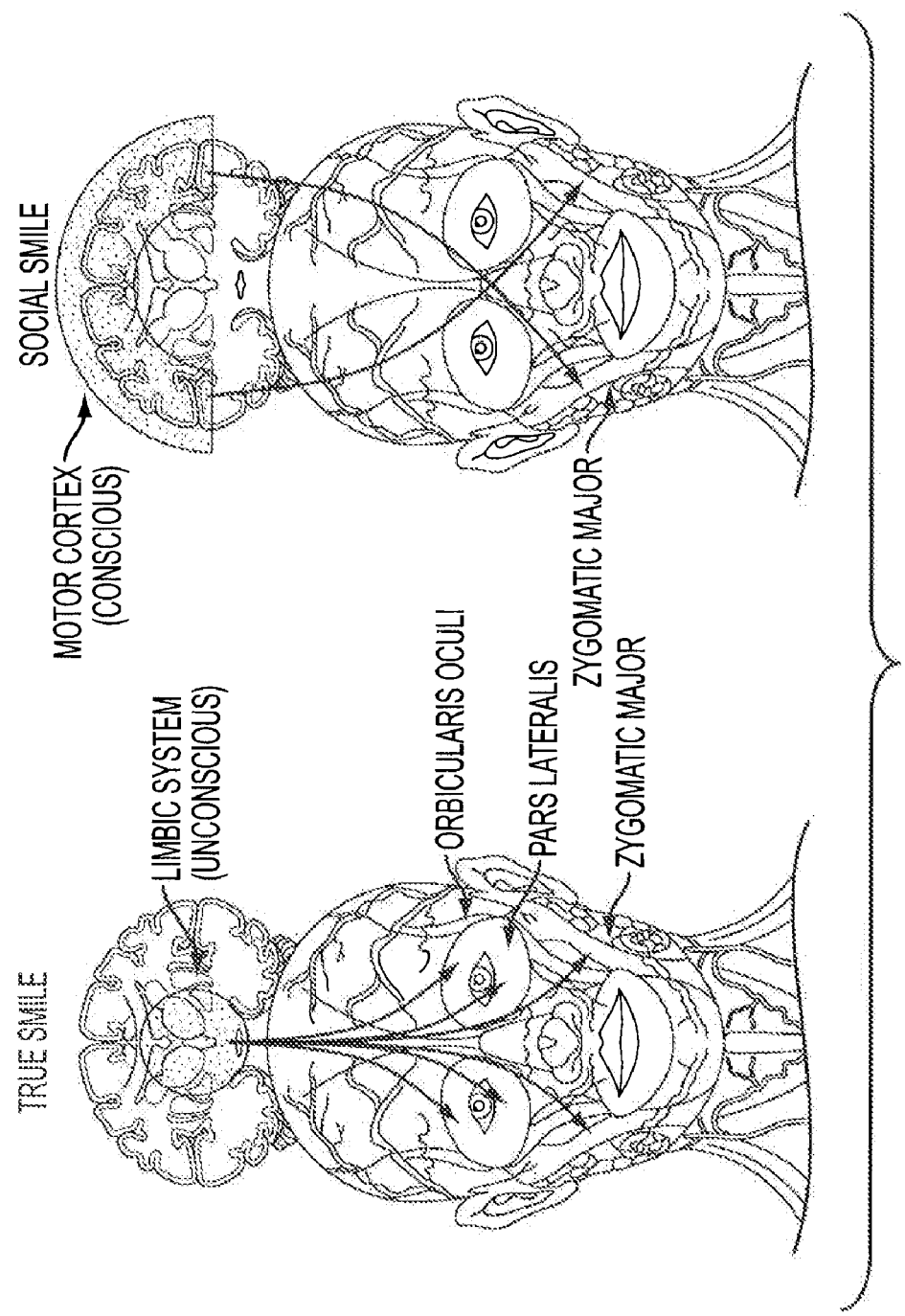
FIG. 5 is a depiction of the difference between a true and social smile, according to one embodiment of the present disclosure.

Much like surprise, happiness can be open to some interpretation. That's because there are two types of smiles, as shown in FIG. 5. One is the True Smile, which is so-named because it can't be consciously willed onto the face by more than a very small portion of the populace (perhaps 10% or less). The other smile type, Social Smiles, however, can be used to "mask" or attempt to camouflage one's actual response. Thus, a person who dislikes an ad may nevertheless smile, not wanting to offend anyone they feel might be watching. As a result, smiles might be divided into the four categories shown in FIG. 4. Those four categories are based on True Smiles, and three types of Social Smiles, whether full (robust), weak, or a micro-smile that is generally brief and typically on one side of the face only. Under a temporal method as described herein, however, it may be possible to more accurately assign smiles to the various categories by looking at other emotions expressed temporally with the smile. Furthermore, the categories of smile and the nature of the analysis can become even more precise, with different Impact and Appeal values assigned to a smile based on its nature. Impact here can include the potency or strength of an expression. Appeal can include its valence. Impact and Appeal are described in more detail in Applicant's U.S. Pat. No. 7,246,081. However values are assigned to both or either of those dimensions of Impact and Appeal, the division of smiles based on whether it's a frustrated smile (happiness and anger shown simultaneously or in close temporal proximity to one another), a sad smile, etc. . . . , offers refinement to the analysis. Such more specific assigning of signs of happiness could likewise be accomplished under the Simplified method of facial coding.

In another embodiment of the present disclosure, if a smile is coded concurrent to a negative emotion, the AU for the smile can be overwritten with an AU indicating a skeptical smile.

Yet another embodiment of the present disclosure relates to calculating secondary emotions shown alongside the primary emotions. Two of six of the core emotions in FACS (all but contempt), might happen simultaneously or in close proximity in time as to make it possible to conclude that a specific, compound or secondary emotion was expressed. See FIG. 6 for an example of possible secondary emotions given two primary emotions. For example, happiness expressed with fear indicates a secondary emotion of guilt or hope. For example, if AU #1 is detected along with AU #20 and AU #12 happening soon thereafter, its possible then to assume that the fear element present as part of the three-way split of AU #1 is augmented, or verified, by AU #20, which is all about fear, happening shortly thereafter. With fear as one of the two key or primary emotions, followed by AU #12, which involves only happiness, one can then go to the chart in FIG. 6 and more convincingly argue that guilt and hope are the two most plausible secondary emotions, as they are the two where happiness and fear intersect. Clearly, with temporal proximity invoked, secondary emotion assignments could likewise be accomplished using the Simplified method of facial coding.

Figure 7:
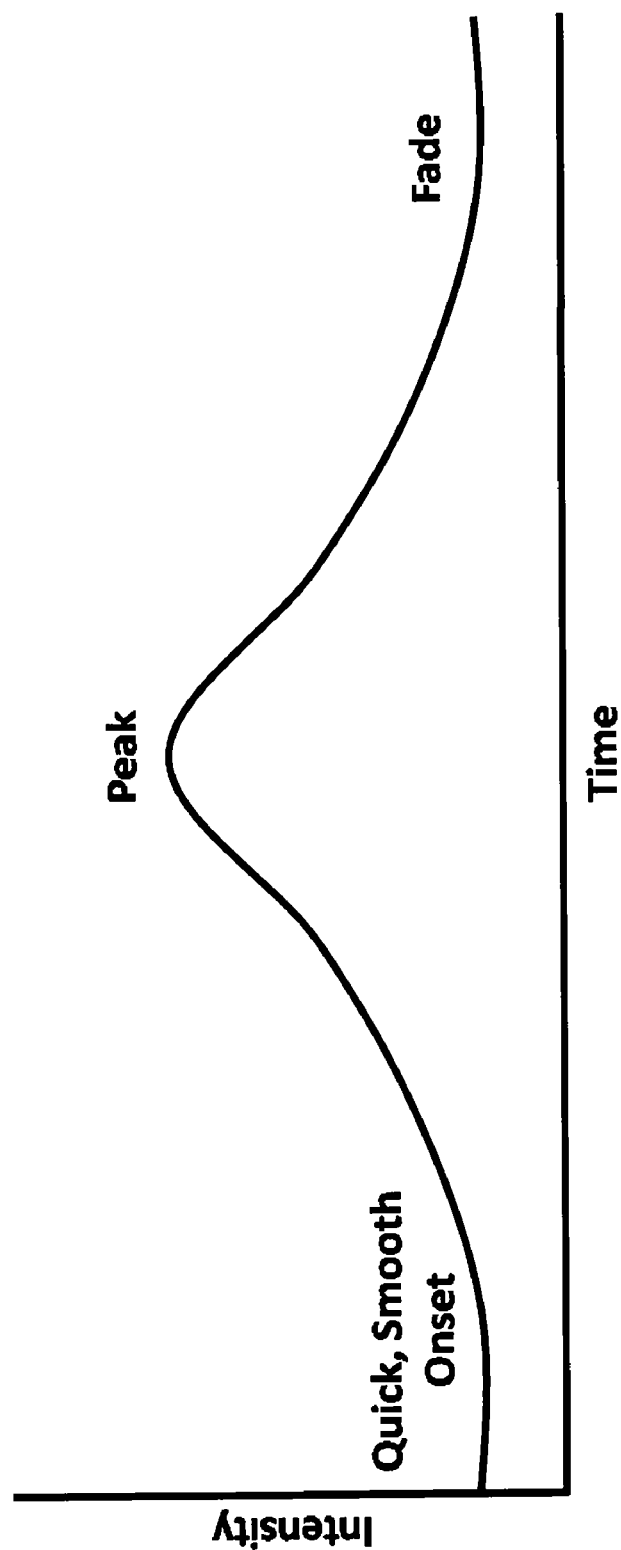
FIG. 7 is a diagram of the typical muscle movement pattern during expression of an emotion, according to one embodiment of the present disclosure.

Another embodiment of the present disclosure of more accurately analyzing emotions from facial coding data may utilize a measurement of the duration that a given AU is expressed. As FIG. 7 illustrates, when an AU gets expressed there's an on-set or beginning of the emotion being expressed on the face. This on-set will cause the muscle to lift, pull or otherwise change its shape and/or position on the face. Then, as the expression occurs more fully, the "peak" or greatest moment of intensity of the expression will happen, followed by the offset or diminishment. This entire onset, peak, and offset period may occur over no more than a fraction of a second to a couple of seconds, most commonly. But precisely how long it lasts can be of great significance to knowing how much weight, or importance to give the emotion being expressed. For example, the same AU held for a relatively longer duration can mean more than if held for a relatively shorter period of time.

The addition of duration calculations can be important in the case of smiles, for example, because of all the emotions, smiles can often linger for longer than other negative expressions of emotion. Moreover, a smile may vary in its type, say, from a true smile on first hearing a joke in an ad, to a gradation down to a strong social smile (AU #12 alone), followed by a weaker version of that smile still, only to return to a true smile (AU #6+#12), if for instance, the joke is alluded to again in the stimulus. As a result, knowing not just when an AU occurred, but for how long it lingers on the face, and demarcations between the various levels of a smile, can be important to extracting the most meaningful and helpful analysis. Moreover, in assigning weights to positive and negative emotions alike based on the expressed AUs, the duration of the smile could be a factor in assigning the most precise value to it in the mix of data for that given moment as well as over the course of reaction to the marketing stimulus or stimuli. Again, the Simplified method of coding is compatible as an alternative to using FACS.

With duration intervals captured, dividing the facial coding results into more precise increments becomes possible. For instance, it might be desirable to track the emotional response in five second chunks during a 30-second TV spot. But it might alternatively or additionally be desirable to divide the emotional response every time there's a scene shift, a new camera angle, a shift in the camera's focus, an increase in the volume level during a radio spot, etc. . . . For instance, in viewing and reacting to a print ad or a pop-up ad on screen on a web site page, knowing the first 0.5 seconds, then with subsequent equally short intervals, can lend itself to greater precision in the analysis to follow. If duration is not accounted for, difficult questions can arise as to when to take the AU occurrence: at the peak? At the onset? And of course, for how long. Tracking duration can aid greatly in solving those issues.

Figure 8:
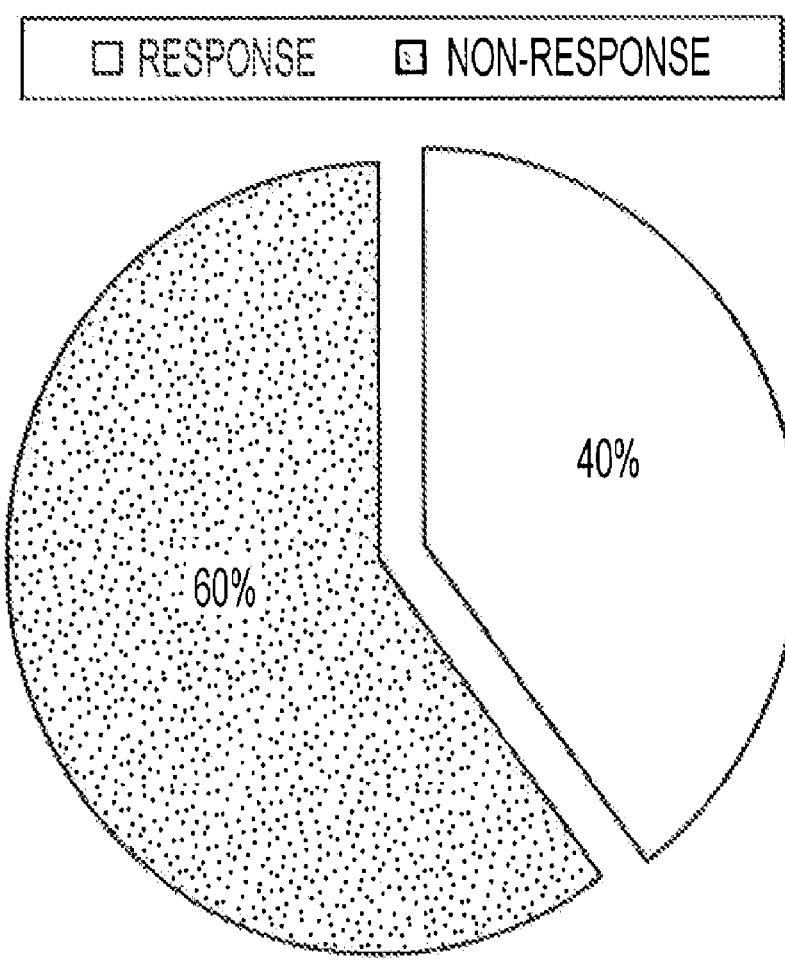
FIG. 8 is a graph of the amount of engagement measured, according to one embodiment of the present disclosure.

Another embodiment of the present disclosure to accurately interpret raw facial coding data can include gauging the Engagement or amount, and timing, of when people are interested in what they are experiencing enough to have a visible, code-able emotional response. This method may look at what percentage of test participants in response to a given stimulus have at least a single code-able expression that they show during the duration period of the stimulus, or a particular portion of the stimulus. This measurement may be referred to as the "breadth" of engagement of a subject. FIG. 8 shows for example, a breadth of engagement of 40%, which means that 40% of the sample test population emoted at least once during exposure to the stimulus. However, that is but part of how Engagement might be tracked. As FIG. 8 also shows, the "depth" of the engagement, which shows how many AUs that 40% of the populace emoted on average during the duration of the exposure period. In that case, for instance, a reading of 2.02 means that the 40% emoted, on average, 2.02 AUs during the course of the exposure period. A formula can then be used to combine or otherwise factor together breadth and depth of engagement to arrive at an engagement score. This approach to engagement can likewise be used with the Simplified method of coding.

Another embodiment of the current disclosure to accurately interpret raw facial coding data may include calculating the ability of a stimulus to break through and gain people's attention, given all the media options, and increased resistance to advertising. This calculation may be referred to as "Stopping Power." This method may take the engagement reading and combine it with the Impact score, with Impact again referring to the intensity or potency of the reaction, and engagement referring to the percentage of individuals who emote at least one emotion. Thus, the Stopping Power, in one embodiment, can be determined by looking at both the intensity (the Impact) of the stimulus and the percentage of individuals who react.

Figure 9:
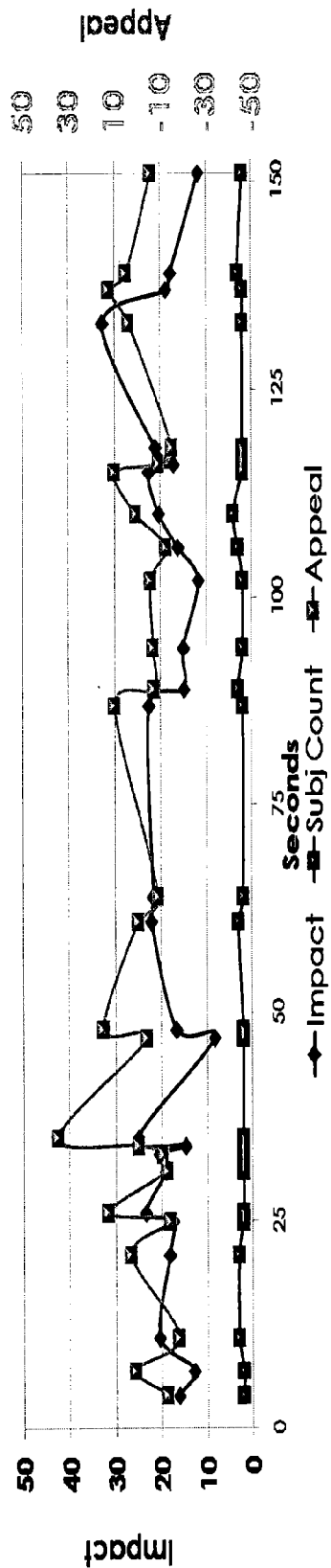
FIG. 9 is a graph of the Impact and Appeal scores changing over time, according to one embodiment of the present disclosure.

The Impact score, as shown in FIG. 9, can be recorded at a point in time during the exposure and summarizes the set of test participants' emotional response at that moment in time to the stimuli or question about the stimuli. The higher the Impact level the stronger the emotional response. In calculating an Impact score, each AU can be assigned both an Impact and, additionally or optionally, an Appeal value. The Appeal value may be a classification of the valence of the particular emotions, either positive/neutral, negative/neutral, negative, and strong negative, for example. The Impact value assigned a given AU may depend on which Appeal category an emotion is in. This is because, as shown in FIG. 10, the various AUs have different strengths to them (in Impact terms) and are more negative or positive in valence or Appeal terms. Thus, AU #24 in the negative column is consistent with anger as an emotion, but AU #23 is also associated with anger. AU #23, however, appears in the Strong Negative Appeal column because a careful review of how each AU gets expressed will show that the contraction of the muscles around the mouth is more intense, or aggravated, with AU #23, which leads to a small bulge forming just below the middle of the lower lip. As a result, AU #23 deserves a stronger Impact weight when scoring is derived.

This natural Impact weight might be adjusted depending on other factors as well. For example, if AU #23 is shown for a greater duration of time than normal, then more weight could likewise be added as a second scoring/analysis factor over and above the AUs natural intensity weight.

Another adjustment factor for calculating Impact, and thus Stopping Power, as shown in FIG. 10, could be the engagement breadth at that precise moment. As evident in FIG. 10, for instance, at about second 110, the number of participants who were engaged is higher than at other seconds during the exposure.

To calculate Stopping Power, some mathematical formula can be used that links Impact to engagement, with a multiplication of one result by the other being one example means of doing so. One skilled in the art would understand that many different permutations are possible without departing from the scope of this disclosure.

Unlike Stopping Power, where simply creating a strong reaction may be enough to merit grabbing people's attention, Persuasion is another key measure that occurs more in terms of valence or Appeal. That's because persuasion—not merely turning somebody "on," but also winning them "over"—requires the creation of an emotional response ideally predominated by positive (happiness/smiling) results and the relative absence of negative emotional reactions that might serve as speed bumps that block making somebody conducive to being persuaded to buy the product/service offering. To that end, one example method of arriving at a representation of persuasion may be to multiply engagement by Appeal. This will arrive at a figure that represents how engaged the users are and whether that engagement is either positive or negative. As with Stopping Power, again the specific AUs in question, the duration of their exposure, and the volume of test subjects showing an emotional response at a given point in time can all be factors as well. Again, the Simplified method of coding can be applicable here, too, in that any weighting, duration, and predominance of positive versus negative expressions of feelings can be tracked.

Another embodiment of the current disclosure may identify the most influential, memorable exposure or experience in the stimulus. Here, a focus can be what moments in the exposure may be most decisive in tipping people's response, thereby signaling what's most influential and memorable for them. Of importance here may be what are the "peak" moments of engagement and response, and what are the nature of the emotional response that occur at those peak moments. The peak could be either on an individual basis, when somebody emotes the most in terms of AUs shown, or collectively across the sample population. Identifying and isolating those moments will make possible knowing, with greater accuracy, what's likely to be important in forming people's impressions and also what they will most likely recall about exposure to a stimulus. Note that this peak does not necessarily have anything to do with the peak expression of a single AU during the passage from onset to offset or fade. To calculate this value, one can use the Impact and Appeal scores, as well as levels of engagement as they are measured at various instances in the exposure to the stimulus.

This peak information can be used not only in identifying the snap-shot moments/or details in an ad that are most crucial, but also the nature of the response and in a measure of the advertisement's recall potential. The recall potential is the potential that the advertisement will be remembered by the viewer after it is over.

Stopping Power, engagement, Impact, Persuasion, and Appeal, can all be used in a formula for deriving the recall potential of an ad. Such information can be additionally used in making predictions of how the advertisement is likely to be received by the public based on the nature of the specific emotions and the percentages of those emotions that have occurred at the peak, most engaged moment of the stimulus. Again, the Simplified method of coding is also fully compatible with deriving such a measure.

Figure 11:
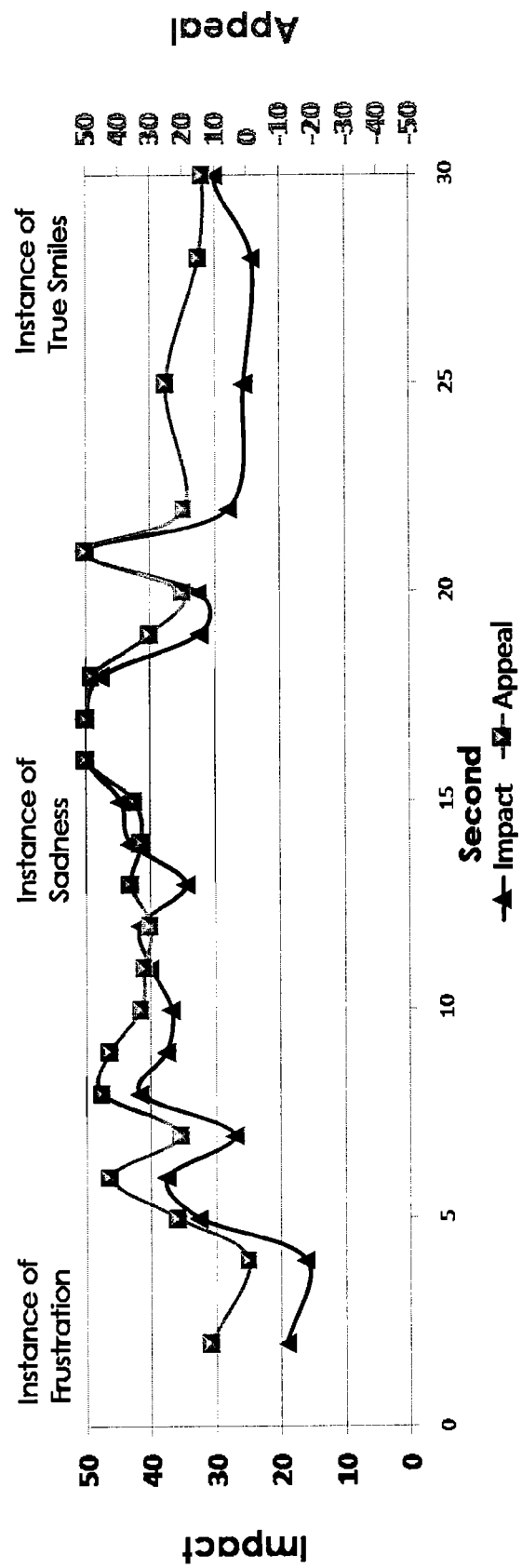
FIG. 11 shows a second by second reading of specific emotional concentrations, according to one embodiment of the present disclosure.

In a further embodiment, the scoring methods utilized in this disclosure can be tailored to measure the critical spots of a stimulus. For example, the opening and closing of a TV spot, say, the first five or last five seconds, or in the case of a print ad, the first second to five seconds of exposure or final impression over a five or ten second exposure period, may decisively determine whether the stimulus is a success or failure. This is because if people cannot orient, get engaged by, and enjoy an ad almost immediately, they may turn their attention away from it, depriving a company a chance of driving further consideration of the ad. Likewise, people remember more strongly endings and final impressions. FIG. 11 shows the specific emotions that register at given times most predominantly during, in this example, exposure to a TV spot. As such another scoring measure can isolate these important spots, reporting them individually or through only focusing on those timeframes using the methods cited in the current disclosure. Again, the Simplified method of coding is also compatible with capturing these types of scoring results.

Another embodiment of this disclosure calculates a viewer's happiness, which can be defined in terms of frustration vs. pleasure. Because breaking through the clutter quickly to grab people's attention can be impacted by whether or not they find the ad accessible, this can be a measure worth capturing. In this method, taking the first few seconds of exposure but isolating frustration because it relates to being confused makes it useful vis-à-vis the amount of happiness shown. A bar chart ratio or a simplified version of FIG. 4, isolating frustration level vs. happiness may suffice as one way to achieve this isolated variable.

In yet another embodiment of the present disclosure, a method may calculate the wear-out or longevity of an ad. This can be very important and could be measured better using facial coding to capture the emotional aspect of what is essentially consumer fatigue, or lack thereof, regarding seeing or otherwise being exposed to a piece of advertising. Because ad agencies, their clients, and media planning firms must decide how extensive of a buy to make, regarding number of viewings and frequency for TV, or how many issues in a magazine, for instance, an ad should appear in, knowing whether an ad grows on people or quickly gets dull is important. Engagement measures can help here, as can simply the amount of Appeal. However measured though, this can become another piece currently missing from measuring results.

Figure 12:
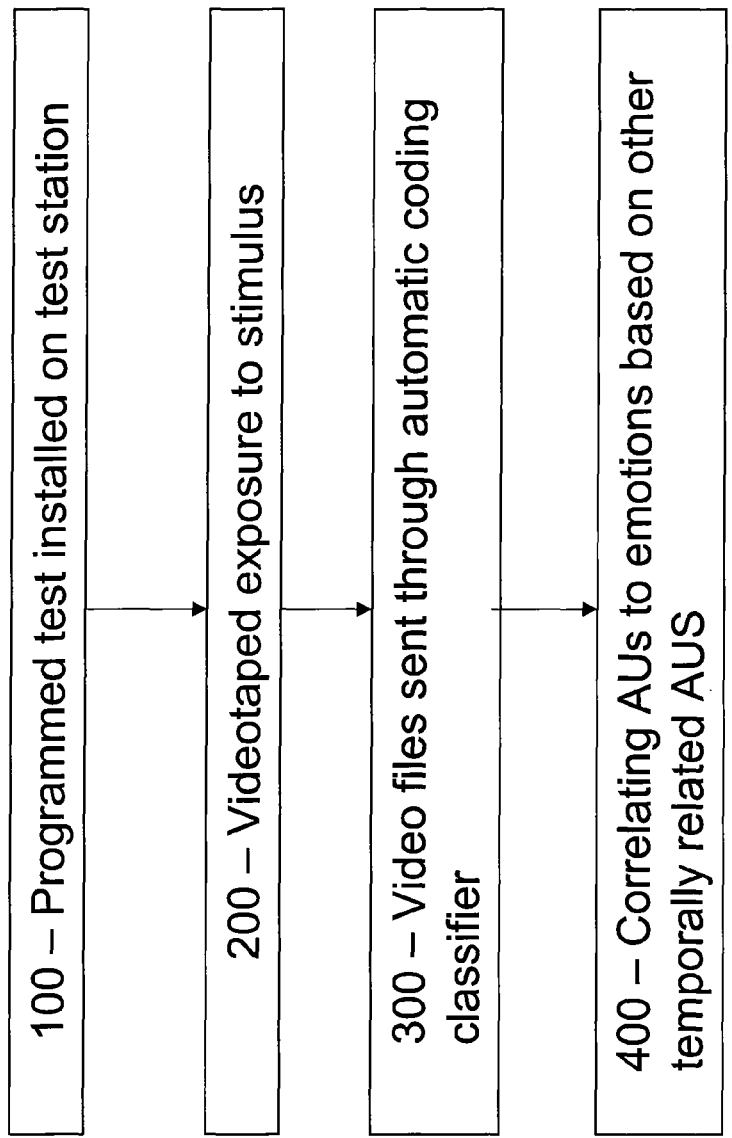
FIG. 12 shows a method of accurately determining emotions according to one embodiment, according to one embodiment of the present disclosure.

Referring now to FIG. 12, one embodiment of the current disclosure is shown. The method begins with the hardware and software being configured. Specifically, a test station can be programmed with the test in step 100. Next, the test subjects can be exposed to the stimulus and videotaped in step 200. The video files may be sent through an automatic coding classifier where AUs are assigned to the facial muscle movements detected in step 300. Finally, AUs can be correlated to emotions based upon other temporally related AUs in step 400.

Although the various embodiments of the present disclosure have been described with reference to preferred embodiments, persons skilled in the art will recognize that changes may be made in form and detail without departing from the spirit and scope of the present disclosure.

I claim:

1. A method of assessing consumer reaction to a stimulus, comprising:
   (a) receiving a visual recording stored on a computer-readable medium of facial expressions of at least one human subject as the subject is exposed to a stimulus so as to generate a chronological sequence of recorded facial images;
   (b) accessing the computer-readable medium for automatically detecting and recording expressional repositioning of each of a plurality of selected facial features by conducting a computerized comparison of the facial position of each selected facial feature through sequential facial images;
   (c) automatically coding contemporaneously detected and recorded expressional repositionings to at least a first action unit, wherein the action unit maps to a first set of one or more possible emotions expressed by the human subject;
   (d) assigning a numerical weight to each of the one or more possible emotions of the first set based upon the number of emotions in the set and common emotions correlating to at least a second set of one or more possible emotions related to at least one other second action unit detected within a predetermined time period of detecting the at least a first action unit.

2. The method of claim 1, wherein the numerical weight assigned to the common emotions between the one or more possible emotions of the first set and the at least second set is greater than non common emotions.

3. The method of claim 2, wherein the difference between the numerical weights assigned to the common emotions and the non common emotions is proportional to the temporal difference between detection of the first action unit and the second action unit.

4. The method of claim 1, wherein the numerical weight associated to the common emotions represents a probability that the human subject is expressing that particular emotion at the time the first action unit is coded.

5. The method of claim 1, wherein at least one of the first and second sets of one or more possible emotions comprises surprise.

6. The method of claim 5, wherein at least one of the first and second sets of one or more possible emotions comprises an emotion other than surprise.

7. The method of claim 6, further comprising assigning a valence of positive, negative, or a blend of positive and negative to the surprise emotion based upon the emotion other than surprise.

8. The method of claim 1, wherein at least one of the first and second sets of one or more possible emotions comprises happiness, and is associated with a type of smile.

9. The method of claim 8, wherein at least one of the first and second sets of one or more possible emotions comprises an emotion other than happiness.

10. The method of claim 9, further comprising modifying the type of smile associated with the happiness emotion based upon the emotion other than happiness.

11. The method of claim 1, further comprising identifying secondary emotions based upon the first action unit and the second action unit.

12. The method of claim 11, wherein identifying secondary emotions from the first and second action units comprises using the first and second action units as indices into a table that contains the secondary emotions.

13. The method of claim 1, further comprising calculating the duration of the first and second action units.

14. The method of claim 13, wherein the numerical weight assigned to the common emotions is based at least in part upon the duration of the first action unit.

15. The method of claim 1, further comprising calculating an engagement score, wherein the engagement score comprises a percentage of human subjects that exhibited at least one action unit during a defined time period.

16. The method of claim 15, further comprising calculating an impact score for each of the action units where the impact score relates to the intensity of the expressed action unit.

17. The method of claim 16, further comprising calculating a stopping power by multiplying the impact score by the engagement score.

18. The method of claim 17, further comprising displaying on an output screen at least one of: the impact score, the engagement score, and the stopping power.

19. The method of claim 17, further comprising calculating a persuasion score relating to the power of the stimulus to persuade the one or more human subjects to agree with a message conveyed by the stimulus, wherein the persuasion is calculated based, at least in part, upon the engagement and appeal score, wherein the appeal score relates to the valence of an emotion.

20. The method of claim 19, further comprising calculating a longevity score of the stimulus, relating to the resistance of a stimulus to consumer fatigue, and wherein the longevity score is based, at least in part, upon the engagement score, impact score, and appeal score.

21. The method of claim 1, further comprising displaying on an output screen the numerical weight assigned to the emotions of at least one action unit.

22. A method of assessing consumer reaction to a stimulus, comprising:
 (a) receiving a visual recording stored on a computer-readable medium of facial expressions of at least one human subject as the subject is exposed to a stimulus so as to generate a chronological sequence of recorded facial images;
 (b) accessing the computer-readable medium for automatically detecting and recording expressional repositioning of each of a plurality of selected facial features by conducting a computerized comparison of the facial position of each selected facial feature through sequential facial images;
 (c) automatically coding contemporaneously detected and recorded expressional repositionings to at least one action unit;
 (d) assigning a weight to one or more possible emotions associated with the at least one action unit based upon at least one second action unit.

23. The method of claim 22, wherein the second action unit relates to expressional repositionings detected within a predetermined time period of detecting the at least one action unit.

* * * * *